(12) United States Patent
Shinoda

(10) Patent No.: US 7,522,942 B2
(45) Date of Patent: Apr. 21, 2009

(54) ON-VEHICLE RADIO COMMUNICATION APPARATUS

(75) Inventor: Koji Shinoda, Chiryu (JP)

(73) Assignee: Denso Corporation, Kariya (JP)

( * ) Notice: Subject to any disclaimer, the term of this patent is extended or adjusted under 35 U.S.C. 154(b) by 802 days.

(21) Appl. No.: 11/147,028

(22) Filed: Jun. 7, 2005

(65) Prior Publication Data

US 2005/0272482 A1 Dec. 8, 2005

(30) Foreign Application Priority Data

Jun. 7, 2004 (JP) .............................. 2004-169128

(51) Int. Cl.
*H04Q 7/32* (2006.01)
(52) U.S. Cl. .................... 455/574; 455/572; 455/550.1; 455/569.1; 455/569.2; 455/344; 320/114; 320/115; 320/136; 320/127; 320/165; 340/438; 340/455
(58) Field of Classification Search ................. 455/574, 455/572, 550.1, 569.1, 569.2, 344, 345, 346, 455/575.1, 347, 343.1, 343.2, 343.3, 343.4, 455/343.5, 422.1; 320/114, 115, 136, 127, 320/128, 164, 165; 340/438, 455
See application file for complete search history.

(56) References Cited

U.S. PATENT DOCUMENTS 5,200,688 A * 4/1993 Patino et al. ................. 320/104
5,870,685 A * 2/1999 Flynn ......................... 455/573
5,929,604 A    7/1999 Irvin

FOREIGN PATENT DOCUMENTS

JP        2003-063330        3/2003

OTHER PUBLICATIONS

First Office Action dated Mar. 9, 2007 in Chinese Application No. 2005 1007 6141.2 with English translation.
Decision of Rejection dated Jan. 4, 2008 in Chinese Application No. 2005 1007 6141.2 with English translation.
Second Office Action dated Sep. 7, 2007 in corresponding Chinese patent application No. 200510076141.2.

* cited by examiner

*Primary Examiner*—Keith T Ferguson
(74) *Attorney, Agent, or Firm*—Harness, Dickey & Pierce, PLC

(57) ABSTRACT

In an on-vehicle radio communication apparatus, when the battery is in a voltage discharging state, every time a predetermined period passes, a current consumption value is updated for the radio circuit by integrating the current consumption for steady operation of the radio circuit. In addition, every time an event occurs in the radio circuit, the current consumption value is updated for the radio circuit by integrating the current consumption for the event operation. If the current consumption value is greater than or equal to a predetermined threshold value, the operation is stopped.

4 Claims, 5 Drawing Sheets

FIG. 2

| OPERATION | OPERATION TYPE | REDUCED CURRENT CONSUMPTION | CORRECTION WITH TRANSMITTING POWER |
|---|---|---|---|
| 1x AREA WAITING | STEADY OPERATION | 0.0027 mAh/SECOND | NOT NEEDED |
| 1x-EVDO AREA WAITING | STEADY OPERATION | 0.0031mAh/SECOND | NOT NEEDED |
| HYBRID AREA WAITING | STEADY OPERATION | 0.0060mAh/SECOND | NOT NEEDED |
| POSITION REGISTRATION | EVENT OPERATION | 0.26mAh/EVENT | NEEDED |
| COMMUNICATION | STEADY OPERATION | 0.30mAh/SECOND | NEEDED |
| SMS COMMUNICATION | EVENT OPERATION | 0.45mAh/EVENT | NEEDED |
| SEARCH OUT OF RANGE | EVENT OPERATION | 0.23mAh/EVENT | NOT NEEDED |
| SLEEP OUT OF RANGE | STEADY OPERATION | 0.00028mAh/SECOND | NOT NEEDED |

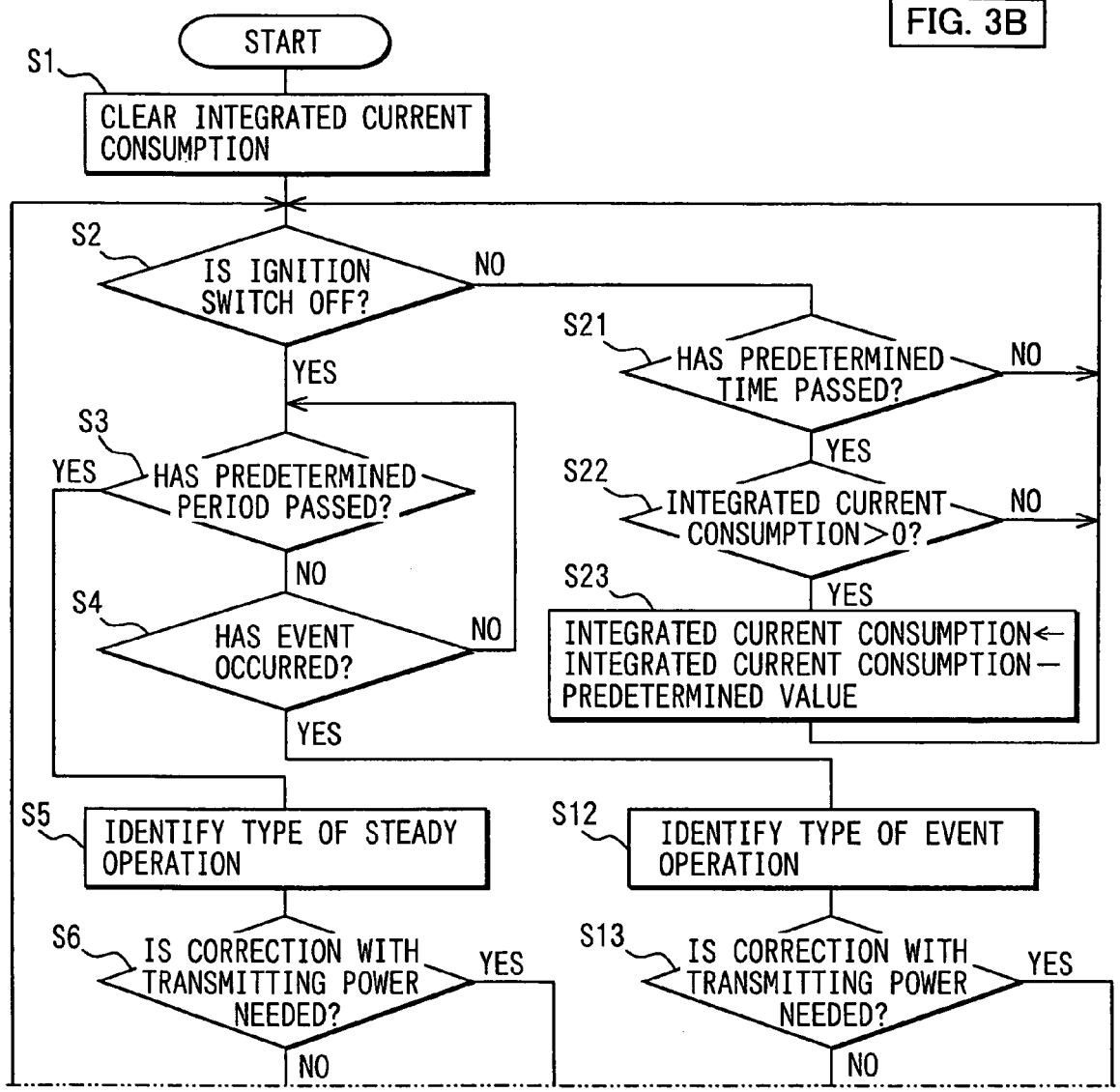

ON-VEHICLE RADIO COMMUNICATION APPARATUS

CROSS REFERENCE TO RELATED APPLICATION

This application is based upon, claims the benefit of priority of, and incorporates by reference the contents of, Japanese Patent Application No. 2004-169128 filed on Jun. 7, 2004.

FIELD OF THE INVENTION

The present invention relates to an on-vehicle radio communication apparatus fitted with a radio means that operates by being powered electrically by a battery.

BACKGROUND OF THE INVENTION

For remote vehicle control and/or remote vehicle monitoring, a radio communication apparatus for use on a vehicle is so constructed as to be supplied with electric power from the battery always even while the ignition switch is off. However, the battery may be dead when the ignition switch is off for a long time while the vehicle is parked. An on-vehicle radio communication apparatus that prevents the battery from being dead forces itself to stop operating when a predetermined time has passed after the ignition switch is turned off. Another on-vehicle radio communication apparatus (see, for example, Japanese unexamined patent publication No. 2003-63330) that prevents the battery from being dead includes a power supply ECU, which is interposed between the battery and various ECUs and monitors the current flowing from the battery into the various ECUs. When the current flowing from the battery into the various ECUs reaches a threshold value, the apparatus forcedly stops the power supply from the battery to the various ECUs.

However, the apparatus that forces itself to stop operating when the predetermined time has passed after the ignition switch is turned off forces itself to stop operating when the predetermined time has passed regardless of the operation of the radio circuit, even when the apparatus operates for data communication, a search out of range, and/or the like, which causes the radio circuit to consume a large amount of current, and/or even when the apparatus operates only for waiting and/or the like, which causes the radio circuit to consume a small amount of current. Therefore, it is impossible for the apparatus to stop operating according to the current consumed by the radio circuit. This makes it impossible for the radio circuit to operate properly.

In the apparatus described in Japanese unexamined patent publication No. 2003-63330, the power supply ECU monitors the current flowing from the battery into the various ECUs. This enables the radio circuit to operate properly according to the consumed current. However, a power supply ECU for monitoring the current flowing from the battery into the various ECUs is necessary as hardware. This increases costs and/or manufacturing man-hours.

SUMMARY OF THE INVENTION

In view of the foregoing circumstances, the object of the present invention is to provide an on-vehicle radio apparatus that avoids increases in costs, manufacturing man-hours, etc., and that is fitted with a radio means capable of operating properly according to current consumption.

According to a first aspect, when a battery is discharging, a control means determines whether a predetermined period has passed and that an event has occurred in a radio means. When the control means detects that the predetermined period has passed, the control means identifies the type of the steady operation of the radio means at the time when the predetermined period has passed. Then, the control means calculates a new integrated current consumption by adding the reduced current consumption for the identified steady operation to the integrated current consumption in the radio means at the time when the type of the steady operation is identified. When the control means detects that an event has occurred in the radio means, it identifies the type of the event operation of this event and calculates a new integrated current consumption by adding the reduced current consumption for the identified event operation to the integrated current consumption in the radio means at the time when the type of the event operation is identified. When the control means detects that the new integrated current consumption is equal to or higher than a preset threshold value, it stops the operation of the apparatus.

Accordingly, every time the predetermined period passes, the control means updates the integrated current consumption by integrating the current consumption for a steady operation of the radio means. In addition, every time an event occurs in the radio means, the control means updates the integrated current consumption by integrating the current consumption for the event operation. When the integrated current consumption becomes equal to or higher than the preset threshold value, it stops operating. This makes it possible to stop the operation of the apparatus according to the current consumption in the radio means, thereby enabling the radio means to operate properly according to the current consumption. A power supply ECU for monitoring the current flowing from the battery into various ECUs is not necessary as hardware. This avoids increases in costs, manufacturing man-hours, etc.

According to a second aspect, when the control means identifies the type of a steady operation or an event operation the current consumption for which may be influenced by the transmitting power of the radio means, the control means calculates a new integrated current consumption by correcting the reduced current consumption for the steady operation or the event operation based on the transmitting power and adding the corrected current consumption to the integrated current consumption in the radio means at the time when the reduced current consumption is corrected. Accordingly, even when the control means identifies the type (for example, communication or position registration) of a steady operation or an event operation the current consumption for which may be influenced by the transmitting power of the radio means, it is possible to calculate an accurate integrated current consumption by correcting the reduced current consumption for the steady operation or the event operation based on the transmitting power.

According to a third aspect, when the battery has transited from a discharging state to a charging state, the controls means calculates a new integrated current consumption by subtracting a predetermined value from the integrated current consumption in the radio means at the time when a predetermined time has passed after the battery has transited from the discharging state to the charging state. When the battery has thereafter transited from the charging state to a discharging state, the controls means calculates a new integrated current consumption by adding the reduced current consumption to the calculated current consumption. Accordingly, even when the battery is charged in mid course, the integrated current consumption can be calculated again in consideration of the charging amount in this case. This makes it possible to calculate an accurate integrated current consumption.

BRIEF DESCRIPTION OF THE DRAWINGS

The above and other objects, features and advantages of the present invention will become more apparent from the following detailed description made with reference to the accompanying drawings:

FIG. 2 is a reduced current consumption table;

FIGS. 3A-3B are flowcharts of the processing performed by the CPU; and

DETAILED DESCRIPTION OF A PREFERRED EMBODIMENT

Figure 1:
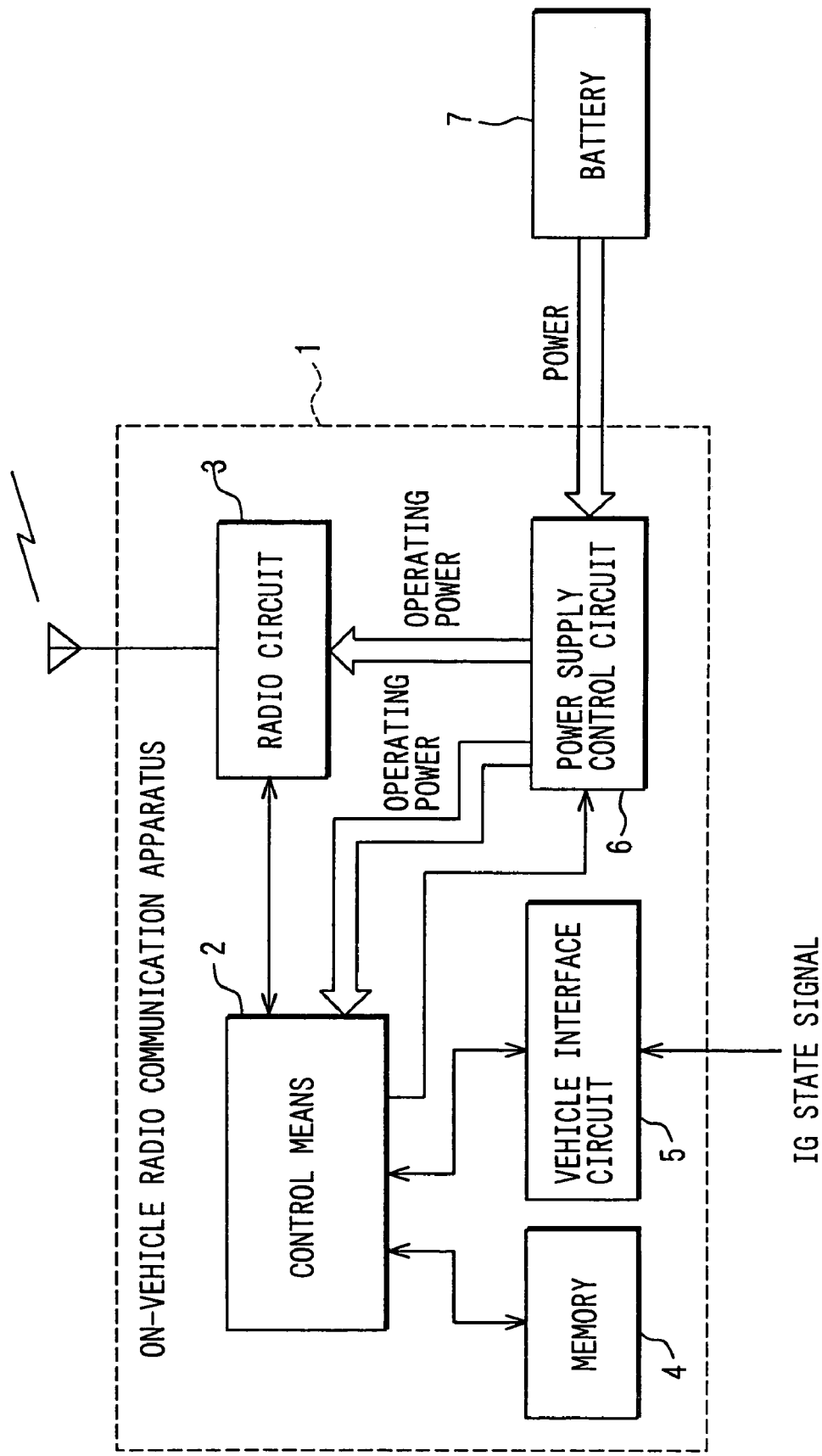
FIG. 1 is a functional block diagram of an embodiment of the present invention.

An embodiment of the present invention will be described below with reference to the drawings. FIG. 1 is a functional block diagram of the whole structure of an on-vehicle radio communication apparatus. The on-vehicle radio communication apparatus 1 comprises a CPU 2 (control means of the present invention), a radio circuit 3 (radio means of the present invention), a memory 4, a vehicle interface circuit 5, and a power supply control circuit 6.

The CPU 2 stores a control program and executes it to control the overall operation of the on-vehicle radio communication apparatus 1. The radio circuit 3 transmits and receives the signals for remote vehicle control and remote vehicle monitoring between this circuit and the base station of a mobile telephone system. The vehicle interface circuit 5 receives IG state signals, which represent the ON-state and OFF-state of the ignition (IG) switch of a vehicle. The power supply control circuit 6 supplies the power of the battery 7 as operating power to the CPU 2 and the radio circuit 3. As shown in FIG. 2, the CPU 2 holds a reduced current consumption table, in which the operations of the radio circuit 3, operation types, the reduced values of current consumption for a predetermined period (T=1 second in this embodiment) of the steady operations or the reduced values of current consumption for each event operation, and the need and needlessness for correction with transmitting power are defined as parameters.

Figure 3B:
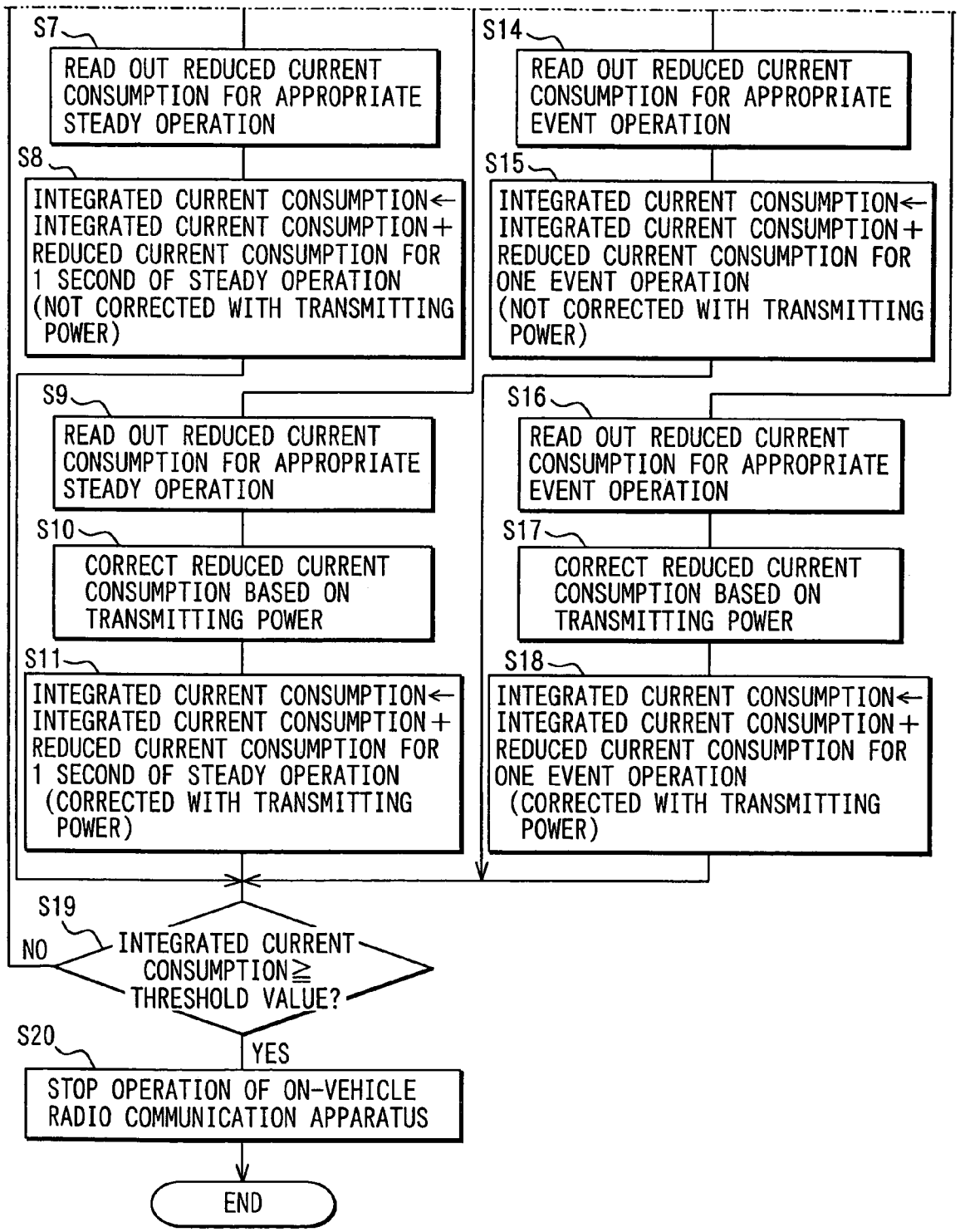
Figure 4:
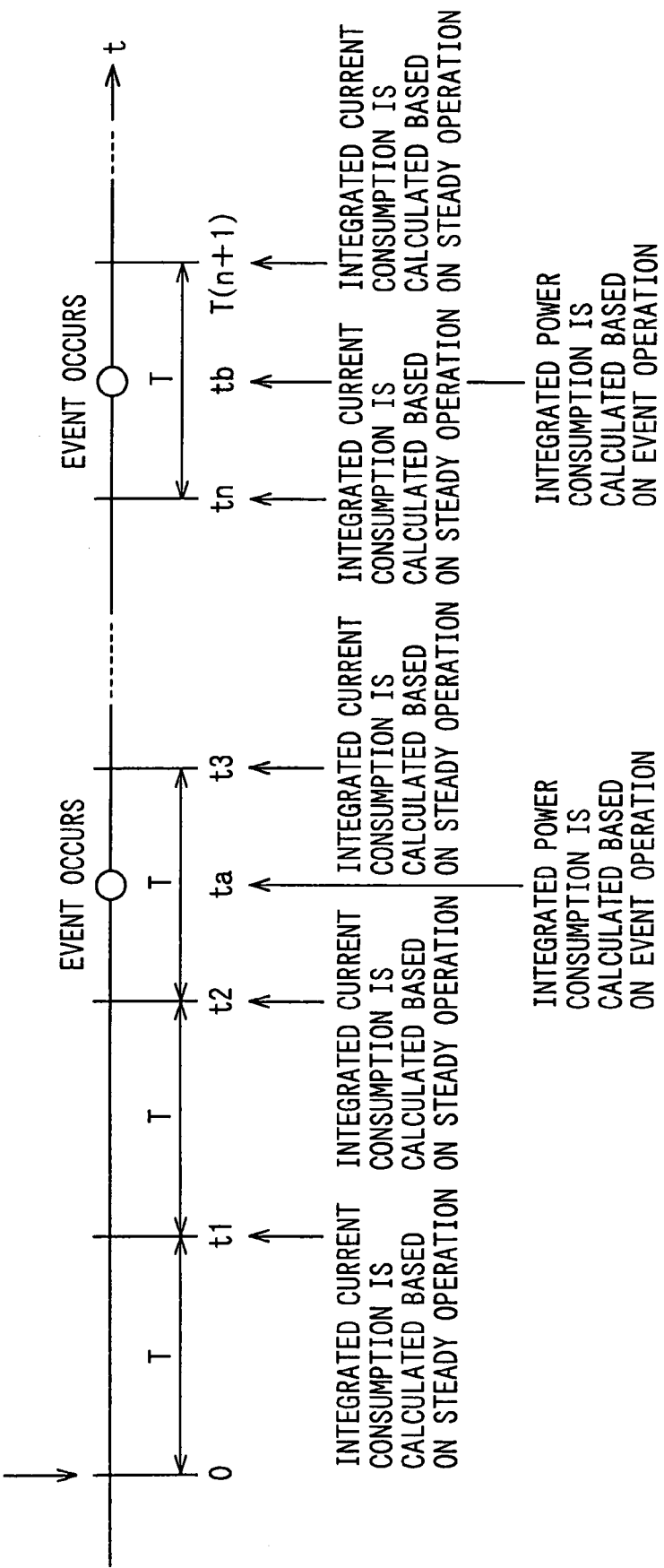
FIG. 4 schematically shows how an integrated current consumption is updated in time series.

The operation of the configuration described above will be described with reference to FIGS. 3A-3B and 4. FIGS. 3A-3B are flowcharts of the processing performed by the CPU 2.

In the on-vehicle radio communication apparatus 1, the CPU 2 starts operating by being supplied with operating power from the power supply control circuit 6. When the CPU 2 starts operating, it clears the integrated current consumption (Step S1) and determines whether the ignition switch is off based on the IG state signal input in the vehicle interface circuit 5, thereby determining whether the battery 7 is discharging (Step S2). When the CPU 2 detects that the ignition switch is off, thereby detecting that the battery 7 is discharging ("yes" at Step S2), it determines whether the predetermined period has passed (Step S3) and monitors whether an event has occurred in the radio circuit 3 (Step S4).

When the CPU 2 detects that the predetermined period has passed ("yes" at Step S3), it identifies the type of the steady operation of the radio circuit 3 at the time when this period has just passed (Step S5) and determines, with reference to the reduced current consumption table, whether the power consumption for the identified steady operation needs to be corrected with the transmitting power of the radio circuit 3 (Step S6). When the CPU 2 detects that the current consumption for the identified steady operation cannot be influenced by the transmitting power of the radio circuit 3, and that the power consumption for this operation does not need to be corrected with this transmitting power (for example, "1× area waiting" in FIG. 2) ("no" at Step S6), the CPU 2 reads out the reduced value of current consumption for the appropriate steady operation with reference to the reduced current consumption table (Step S7) and calculates a new integrated current consumption by adding the read value to the integrated current consumption in the radio circuit 3 at the time when the reduced value is read out (Step S8).

When the CPU 2 detects that the current consumption for the identified steady operation can be influenced by the transmitting power of the radio circuit 3, and that the power consumption for this operation needs to be corrected with this transmitting power (for example, "communication" in FIG. 2) ("yes" at Step S6), the CPU 2 reads out the reduced value of current consumption for the appropriate steady operation with reference to the reduced current consumption table (Step S9), then corrects the read value based on the transmitting power (Step S10), and calculates a new integrated current consumption by adding the corrected value to the integrated current consumption in the radio circuit 3 at the time when the read value is corrected (Step S11).

The transmitting power varies with the distance and/or wave environment between the on-vehicle radio communication apparatus 1 and the base station. The CPU 2 calculates a new integrated current consumption in consideration of the variation of the transmitting power. The CPU 2 may hold the relationships, as a database, between the transmitting power and the distance and/or wave environment between the on-vehicle radio communication apparatus 1 and the base station and correct the transmitting power based on the database. Alternatively, the CPU 2 may acquire one by one the transmitting powers required actually by the radio circuit 3 and correct them. In this way, when the ignition switch is off, the CPU 2 updates the integrated current consumption in the radio circuit 3 every time the predetermined period passes (see t1, t2, t3, tn and t(n+1) in FIG. 4).

When the CPU 2 detects that an event has occurred in the radio circuit 3 ("yes" at Step S4), it identifies the type of the event operation of the event (Step S12) and determines, with reference to the reduced current consumption table, whether the power consumption for the identified event operation needs to be corrected with the transmitting power of the radio circuit 3 (Step S13). When the CPU 2 detects that the current consumption for the identified event operation cannot be influenced by the transmitting power of the radio circuit 3, and that the power consumption for this operation does not need to be corrected with this transmitting power (for example, "search out of range" in FIG. 2) ("no" at Step S13), the CPU 2 reads out the reduced value of current consumption for the appropriate event operation with reference to the reduced current consumption table (Step S14) and calculates a new integrated current consumption by adding the read value to the integrated current consumption in the radio circuit 3 at the time when this reduced value is read out (Step S15).

When the CPU 2 detects that the current consumption for the identified event operation can be influenced by the transmitting power of the radio circuit 3, and that the power consumption for this operation needs to be corrected with this transmitting power (for example, "position registration" in FIG. 2) ("yes" at Step S13), the CPU 2 reads out the reduced value of current consumption for the appropriate event operation with reference to the reduced current consumption table (Step S16), then corrects the read value based on the transmitting power (Step S17), and calculates a new integrated current consumption by adding the corrected value to the integrated current consumption in the radio circuit 3 at the time when the read value is corrected (Step S18). In this way, when the ignition switch is off, the CPU 2 also updates the integrated current consumption in the radio circuit 3 every time an event occurs in the radio circuit 3 (see ta and tb in FIG. 4).

The CPU 2 compares the thus calculated value with a preset threshold value (Step S19). When the CPU 2 detects that the calculated value is lower than the threshold value ("no" at Step S19), the processing returns to Step S2, and the succeeding steps are repeated. When the CPU 2 detects that the calculated value is equal to or higher than the threshold value ("yes" at Step S19), it stops operating, thereby stopping the operation of the apparatus (Step S20) and completing the series of steps.

When the CPU 2 detects that the ignition switch is on, and that the battery 7 has transited from its discharging state to its charging state ("no" at Step S2), it determines whether a predetermined time has passed after the battery 7 has transited from its discharging state to its charging state (Step S21). When the CPU 2 detects that the predetermined time has passed after the battery 7 has transited from its discharging state to its charging state ("yes" Step S21), it determines whether the integrated current consumption in the radio circuit 3 at that time is higher than 0 (Step S22). When the CPU 2 detects that this integrated current consumption is higher than 0 ("yes" at Step S22), it calculates a new integrated current consumption by subtracting a predetermined value from this integrated current consumption (Step S23). Then, the processing returns to Step S2, and the succeeding steps are repeated.

The foregoing description applies to a case where the integrated current consumption is updated every second by holding a reduced current consumption table in which the reduced current consumption for 1 second of each steady operation is defined as a parameter. However, the integrated current consumption might not need to be updated every second, but could be updated every few seconds. Alternatively, the integrated current consumption could be updated every few seconds by holding a reduced current consumption table in which the reduced current consumption for this number of seconds of each steady operation is defined as a parameter.

There may be a case where the battery 7 is discharging. In this case, every time the predetermined period has passed, the on-vehicle radio communication apparatus 1 updates the integrated current consumption by integrating the current consumption for each steady operation of the radio circuit 3. Also, in this case, every time an event occurs in the radio circuit 3, the apparatus 1 updates the integrated current consumption by integrating the current consumption for the event operation. When the updated current consumption becomes equal to or higher than the threshold value, the apparatus 1 stops operating. This enables the apparatus 1 to stop operating according to the current consumption in the radio circuit 3, and also enables the circuit 3 to operate suitably according to the current consumption. A power supply ECU for monitoring the current flowing from the battery 7 into various ECUs is not necessary as hardware. This avoids increases in costs, manufacturing man-hours, etc.

When the current consumption for a steady operation or an event operation may be influenced by the transmitting power of the radio circuit 3, the reduced current consumption for the operation can be corrected based on the transmitting power. This makes it possible to calculate an accurate integrated current consumption.

When the predetermined time has passed after the battery 7 has transited from its discharging state to its charging state, the predetermined value is subtracted from the integrated current consumption in the radio circuit 3 at that time. Consequently, even when the battery 7 is charged in mid course, the integrated current consumption can be calculated again in consideration of the charging amount in this case. This makes it possible to calculate an accurate integrated current consumption.

The present invention is not limited to the foregoing embodiment, but can be modified or extended as follows.

The CPU of the present invention is not limited to a CPU holding a reduced current consumption table. A memory may hold a reduced current consumption table, to which the CPU may refer.

In the reduced current consumption table of the present invention, other things may be defined as operations of the radio circuit of the invention.

In the foregoing embodiment, when the predetermined time has passed after the battery 7 has transited from its discharging state to its charging state, the predetermined value is subtracted from the integrated current consumption in the radio circuit 3 at that time. However, when a time that can be set arbitrarily by a user has passed, a value that can be set arbitrarily by the user might be subtracted from the integrated current consumption in the radio circuit 3. Alternatively, a value set automatically according to the integrated current consumption in the radio circuit 3 might be subtracted from this consumption.

What is claimed is:

1. An on-vehicle radio communication apparatus comprising:
   a radio means that operates by being powered electrically by a battery; and
   a control means for:
   determining whether a predetermined period has passed and that an event has occurred in the radio means, when the battery is discharging;
   identifying the type of steady operation of the radio means at when the control means detects that the predetermined period has passed;
   calculating a new integrated current consumption by adding a reduced current consumption for the identified steady operation to the integrated current consumption in the radio means at the time when the type of the steady operation is identified;
   identifying a type of the event operation of an event when the control means detects that the event has occurred in the radio means;
   calculating a new integrated current consumption by adding a reduced current consumption for the identified event operation to the integrated current consumption in the radio means at the time when the type of the event operation is identified; and
   stopping the operation of the apparatus when the control means detects that the new integrated current consumption is equal to or higher than a preset threshold value.

2. The on-vehicle radio communication apparatus described in claim 1, wherein, when the control means identifies the type of a steady operation or an event operation the current consumption for which may be influenced by the transmitting power of the radio means, the control means calculates a new integrated current consumption by correcting the reduced current consumption for the steady operation or the event operation based on the transmitting power and adding the corrected current consumption to the integrated current consumption in the radio means at the time when the reduced current consumption is corrected.

3. The on-vehicle radio communication apparatus described in claim 2, wherein, when the battery has transited from a discharging state to a charging state, the controls means calculates a new integrated current consumption by subtracting a predetermined value from the integrated current consumption in the radio means when a predetermined time has passed after the battery has transited from the discharging state to the charging state, and wherein, when the battery has thereafter transited from the charging state to a discharging state, the controls means calculates a new integrated current consumption by adding the reduced current consumption to the calculated current consumption.

4. The on-vehicle radio communication apparatus described in claim 1, wherein, when the battery has transited from a discharging state to a charging state, the controls means calculates a new integrated current consumption by subtracting a predetermined value from the integrated current consumption in the radio means when a predetermined time has passed after the battery has transited from the discharging state to the charging state, and wherein, when the battery has thereafter transited from the charging state to a discharging state, the controls means calculates a new integrated current consumption by adding the reduced current consumption to the calculated current consumption.

* * * * *